United States Patent [19]

Taylor et al.

[11] Patent Number: 4,676,020
[45] Date of Patent: Jun. 30, 1987

[54] FISHING LURE PROVIDING CHANGEABLE EFFECTS

[76] Inventors: Rollin E. Taylor, P.O. Box 172; Kenneth J. Taylor, 733 Main St., both of Dayton, Ind. 47941

[21] Appl. No.: 901,801

[22] Filed: Aug. 29, 1986

[51] Int. Cl.$^4$ .............................................. A01K 85/00
[52] U.S. Cl. ................................. 43/42.02; 43/42.06; 43/42.33; 43/42.35
[58] Field of Search ................. 43/42.02, 42.06, 42.33, 43/42.35, 42.32, 42.48, 42

[56] References Cited

U.S. PATENT DOCUMENTS

| | | | |
|---|---|---|---|
| 2,091,457 | 8/1937 | Sauer | 43/42.06 |
| 2,153,489 | 4/1939 | Whitis | 43/42.02 |
| 2,532,879 | 12/1950 | Baker | 43/42.06 |
| 2,560,733 | 7/1951 | Morris | 43/42.06 |
| 2,794,287 | 6/1957 | Mancusi | 43/42.02 |
| 3,037,315 | 6/1962 | Klawitter | 43/42.02 |

Primary Examiner—Gene P. Crosby
Attorney, Agent, or Firm—Robert A. Spray

[57] ABSTRACT

A fish lure providing changeable effects of coloration even during use, by an extendible sock-like colored body interiorly of the lure which gives a variation in the lure's coloration-effect depending on its condition as relatively collapsed or relatively extended condition. An actuator or other devices, automatic upon pulling the line through the water, cause the change from collapsed to extended position, against the bias of other structure opposing the extension, thus giving a variation in the nature of color-change dependent upon how the user pulls the lure through the water. A piston associated with the colored body moves in correspondency to it, forcing water outwardly of the lure, giving further water-disturbing and lure-jiggling effects; and other embodiments provide color-change by fluid in the lure having a color-change responsiveness to changes in temperature and/or pressure. In another embodiment, a rotational propeller device inside the lure provides further fish-attracting motion and coloration-change as the lure is pulled through the water.

16 Claims, 19 Drawing Figures

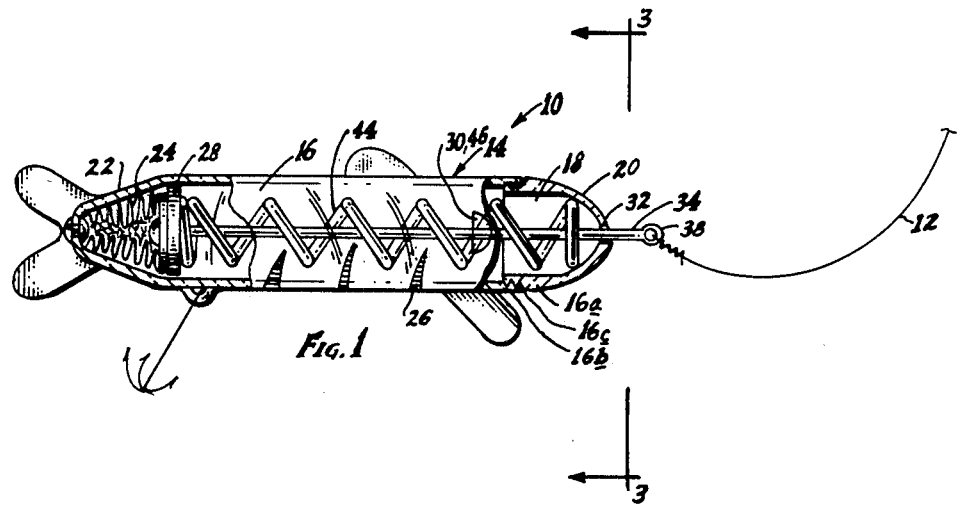
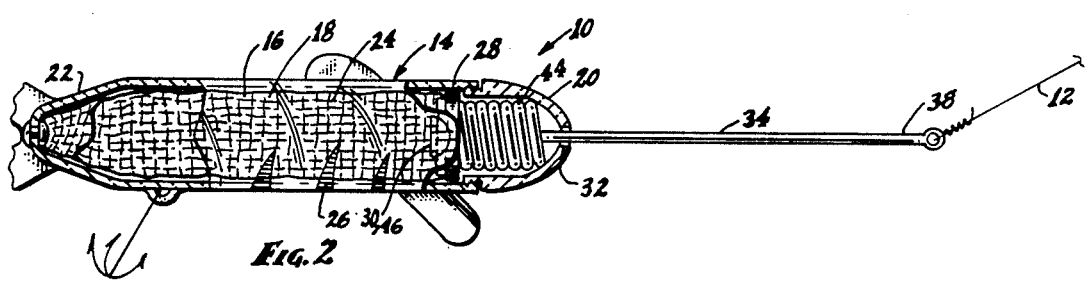
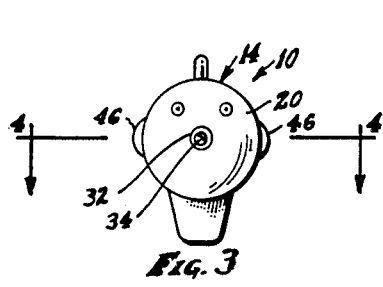
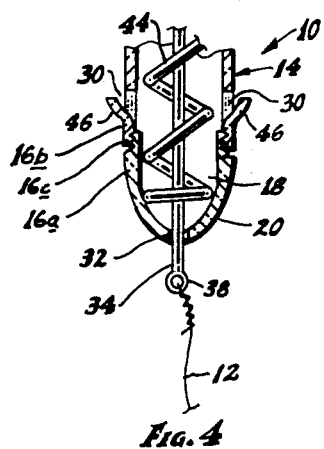

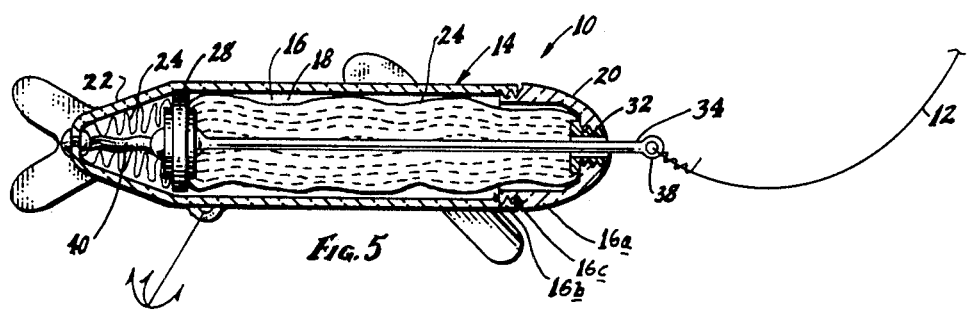
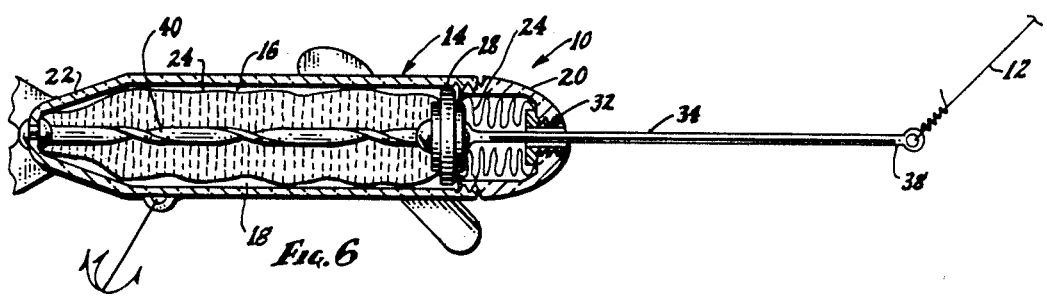
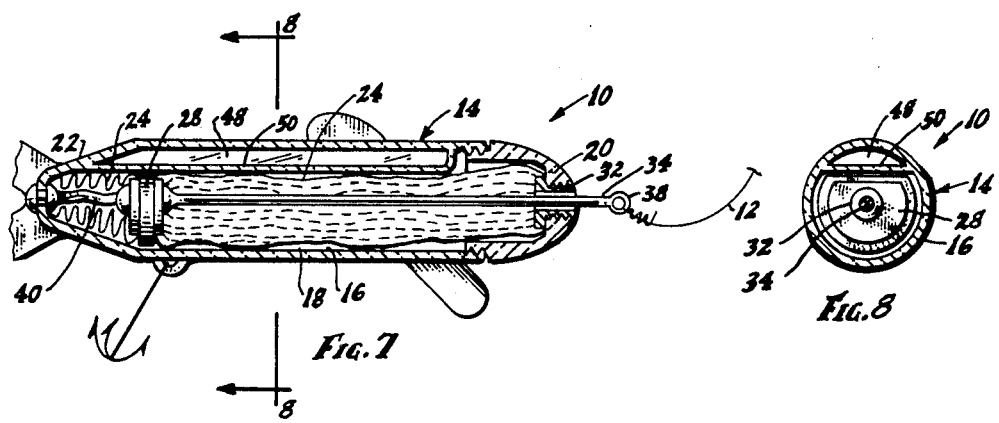

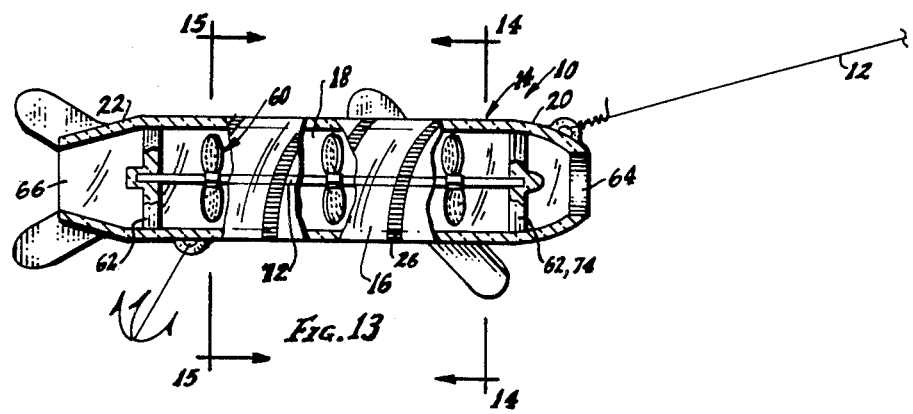
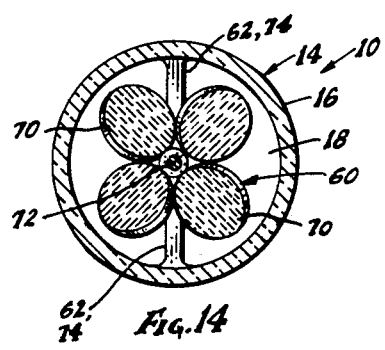
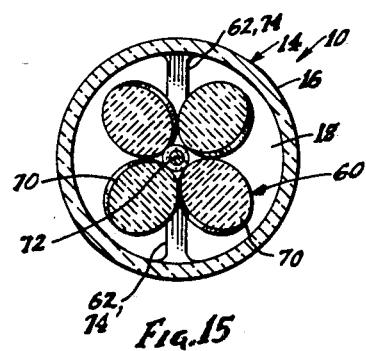

FISHING LURE PROVIDING CHANGEABLE EFFECTS

FIELD AND GENERAL NATURE OF THE INVENTION

This invention relates to fishing, and more particularly to artificial bait devices used in fishing, called "lures" or "plugs," which are retained and pulled by their attachment to a fishing line controlled by the user.

Such devices have been used for scores of years, in many varieties; and they are considered to be desired devices for several reasons, such as the economy of the lack of need of live bait, other objectional or at least disadvantageous factors of live bait and use of live bait, the belief that certain artificial baits may be as or more appealing to certain fish or certain fish-situations than live bait, the provision of variety to the fisherman, etc.; and whatever are the real or even speculative advantages of lure devices, they have long provided and do provide a desired component of many and probably most fishermen's accessories; and they are so well known and universally known that further comment as to their general desirability and long and worldwide use seems quite unnecessary.

Suffice it to say, introductorily, that the lures as conceived and used through the years have provided what might be described as just basically two components, i.e., some sort of hooking or fish-capturing component or mechanism, and some sort of a body member which serves the plural functions of carrying the fish-hooking components or other fish-capturing mechanism, of providing a weight by which the hooking details may be propelled, of providing a connection between the fish-hooking details and the fishing line, and the particularly significant function of providing a lure or appealing attraction which hopefully will entice a fish to strike the lure and be thereby caught.

It is this last-named function to which the present inventive concepts apply; and the present concepts provide a plurality of particulars of hopeful fish-attracting nature.

More particularly, the present invention relates to and provides novel lure-appearance changeability factors, by change of color, change of motion, and by other change of the lure's nature or effects and appearance as a fish would see the lure; and even more particularly, these changes occur even while the lure is being used, all hopefully to give whatever is effective appeal to whatever is the appetite or perhaps curiosity factors of a fish.

Probably no one has ever known precisely what are such factors, i.e., of appetite or curiosity or other factors which provide effectiveness of a lure by providing sufficient appeal to the fish; so the utility of the present concepts is asserted in terms of the novel components and their changeable-effect characteristics, as now summarized, in contrast to asserting that any particular feature provides a certain definite attraction to the fish being sought.

THE PRESENT INVENTIVE CONCEPTS, SUMMARIZED

According to the present invention, the concepts provide a novel fishing lure which provides changeable effects, particularly changes in coloration even while it is being pulled through the water, and other fish-attracting features. The lure is generally of the tubular shape of other lure bodies, but it has an exterior wall which is generally at least translucent; and at least one end of the lure body is provided interiorly with a coloration-effect body shown herein as a tubular sock-like body which is in a collapsed condition until pulled or otherwise forced to a relatively extended condition extending toward the other end of the lure body, providing a significant difference in the appearance of the lure between its appearance between and during each of the two conditions of the coloration-effect body.

Also, there are biasing means provided, which urge the sock-like body to its collapsed condition; and thus if the user will pull the line with a jiggling or intermittent pulling action, the lure will correspondingly change in color repeatedly. In a desired embodiment, the coloration-effect body includes a sort of piston, by which movement of the coloration-effect body causes the piston to move and cause flow of water through an opening in the lure wall; and this extra water motion causes not only some fish-attracting water-movement agitation but the rearward direction of the outward-moving water causes a sort of extra forward propulsion of the lure which can provide more of a pulsating or jiggling movement if the user desires.

Other features of desired embodiments include the provision of a hollow upper chamber for the interior of the lure body, and the provision of other color change effects by providing the lure's hollow interior with fluid which changes coloration upon change of temperature and/or pressure.

Still further coloration-effect is provided by a propeller-like blade, mounted interiorly of the lure body; and as the lure is pulled through the water, the rotational motion of the blade, and the coloration of both the blade and of the translucent lure walls, add to the overall coloration-change effects.

GENERAL REVIEW OF A MULTITUDE OF PRIOR ART ATTEMPTS AT IMPROVING FISH LURES

The very nature and universal appeal of the sport and recreational aspect of various types of fishing, and such factors as the uncertainty of what attracts fish, and the apparent variations in fish appetites, have caused and still cause perhaps as many or more attempts of improvement of fish lures as in any other field of inventive creativity. Those mentioned above are only a few of the factors which no doubt have stimulated or challenged worldwide and age-long attempts at variations of fish lures.

Thus, it seems that the variations have been innumerable, as fishermen and competitive manufacturers of fishing equipment have tried to improve lures for various types of fishing situations and various types of fish species, each creator of a different lure no doubt believing that whatever are its novel aspects are such as to make it particularly desirable.

Yet in spite of the multitude and probably ceaseless efforts of improvements of fish lures, none are known to the present inventors to provide the particular novel features of the present invention in the embodiments here presented.

That is, not only conceding but emphasizing that the continuing worldwide efforts of creating a better fish lure have included many factors and variations such as jiggling, certain changes of appearance, difference in effect depending on how the user applies pull to the fish line, coloration, etc., nevertheless none known to the present inventors have provided the particular coloration-change features, the water pumping, and other features of these embodiments, particularly in the particular combinations even though certain characteristics or effects may have been perhaps provided in individual attempts as to components of the novel features.

Thus this review of representative prior art fish lures and concepts used on or with prior art fish lures helps to emphasize the inventive nature of the present concepts, showing them unobvious even though in retrospect the concepts may appear to be simple; for, instead of detracting from inventiveness, simplicity is regarded as often an element of inventiveness, especially where as here the concepts are a departure from prior art, and where the prior art has long attempted various features of movement, jiggling effects, changing effects, etc., and especially also in this field in which it is of worldwide use, non-technical in nature, and in which the very nature of the use seems likely to have challenged most users to try to better the many types of fish lures which have been conceived and marketed.

BRIEF DESCRIPTION OF THE DRAWINGS

The above description is of somewhat introductory and generalized form. More particular details, concepts, and features are set forth in the following and more detailed description of illustrative embodiments, taken in conjunction with the accompanying drawings, which are of somewhat schematic and diagrammatic nature, and in which:

FIGS. 1, 2, 5, 6, 7, 9, 10, and 13 longitudinal views, mostly in vertical cross-section to show interior details without obscuring:

FIG. 1 illustrates a first embodiment, with the coloration-effect body means in collapsed condition, and fastened to the tail of the lure, the foreground of the side wall being broken away at the head and tail to show details; and this embodiment shows a coil spring for biasing the piston member rearwardly;

FIG. 2 illustrates the lure of FIG. 1, but with the coloration-effect body means pulled into extended position rightwardly toward the lure head;

FIG. 3 is a front elevation view, generally taken by View-line 3—3 of FIG. 1;

FIG. 4 is a horizontal cross-sectional detail of the forward portion of the lure, generally as shown as taken by Section-line 4—4 of FIG. 3;

FIG. 5 is a lure of a second embodiment, showing two of the coloration-effect body means, one shown connected to the lure tail and in collapsed condition, and one shown connected to the lure ahead but shown in extended position; and showing a band-like tension member biasing the piston body rearwardly of the lure;

FIG. 6 is a view of the embodiment of FIG. 5 but with the piston body pulled forwardly in spite of the bias of the tension band, showing the rear coloration body extended but the front coloration body in collapsed condition;

FIG. 7 illustrates an alternative embodiment, in which the lure body is provided to have a hollow chamber along its upper portion, this feature being shown in an embodiment generally similar to that of FIGS. 5 and 6;

FIG. 8 is a transverse cross-sectional view, shown generally as taken by Section-line 8—8 of FIG. 7;

FIG. 9 illustrates another embodiment, this having a compression spring biasing the piston means forwardly, with the coloration-effect body means in collapsed condition; and this embodiment has an open front end, with a check valve shown in closed position blocking movement of the interior water out the open front end of the lure;

FIG. 10 shows the lure of FIG. 9, but with the check valve in open position as the lure is pulled forwardly, illustrating the rearward extension of the coloration-effect body means, against the bias of a compression spring, as caused by water entering the opening at the front end of the lure;

FIG. 13 is a view of another embodiment, portions of the foreground wall being shown as broken away, and illustrating an embodiment having twisted blades carried by a longitudinal shaft, the lure having an open front end for admittance of water which causes the blades to revolve as the lure is pulled forwardly;

FIGS. 14 and 15 are transverse cross-sectional views shown generally as taken by Section-lines 14—14 and 15—15, respectively, of FIG. 13;

Figure 11:
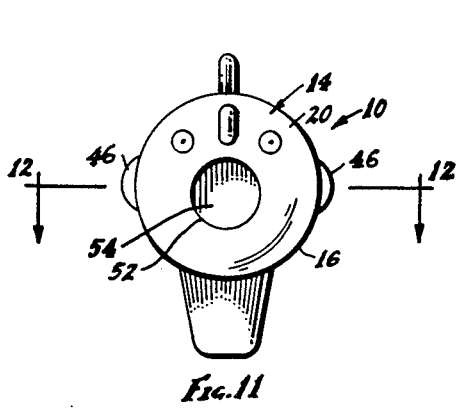
FIG. 11 is a front elevational view, shown generally as taken by View-line 11—11 of FIG. 9.
Figure 12:
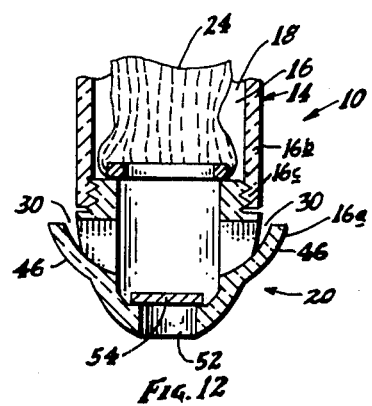
FIG. 12 is a detail horizontal cross-sectional view, of the head end of the lure, generally as taken by Section-line 12—12 of FIG. 11.
Figure 18:
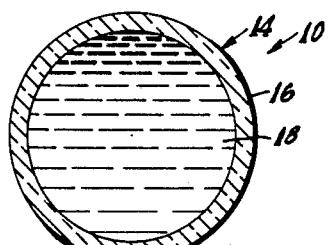
FIG. 18 is a transverse cross-sectional view, shown generally as taken by Section-line 18—18 of FIG. 16.
Figure 19:
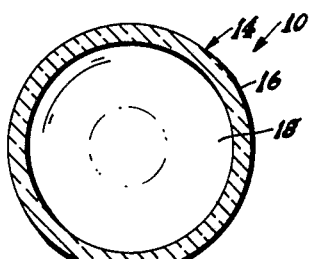
FIG. 19 is a transverse cross-sectional veiw, shown generally as taken by Section-line 19—19 of FIG. 17.

All of the lure bodies shown in longitudinal elevational and/or sections are generally of the same scale, that also being the scale of FIGS. 3, 4, and 8; but FIGS. 11, 12, 14, 15, 18, and 19 are shown in somewhat larger scale.

DETAILED DESCRIPTION OF ILLUSTRATIVE EMBODIMENTS

As shown in the drawings, the inventive concepts provide a novel fishing lure 10 providing for hopefully attracting fish by providing the lure 10 to have changeable effects of coloration and otherwise, which provide what are hopefully attractive, attention-calling, or otherwise stimulative of fish to seize the lure 10 at it is being pulled through the water by the associated fishing line 12.

At first glance, and in overall appearance while it is being looked at in its condition of storage or handling other than when in actual use being pulled through the body of water in a fishing procedure, the lure 10 appears quite conventional, having a body member 14 which provides a generally tubular shaped lure, the lure's overall body member 14 having an exterior wall means 16 and a generally hollow interior 18; but, unlike that of other lures, the exterior wall 16 is provided to be generally at least translucent and if desired even fully transparent.

Also appearing quite conventional for lures (for indeed lures often purposely resemble bait fish) the body member 14 has a head end 20 tail end 22, they of course being substantially spaced along the lure body 14.

Here, however, the close similarity to other known lures of the prior art ends; for according to a basic feature of the inventive concepts, at least one of the head end 20 and tail end 22 of the lure body 14, that as shown in FIG. 1,2 being the tail end 22, is provided in the interior 18 of the lure body wall 16 with what seems most appropriately describable as a coloration-effect body means 24 shown in the general form of a sock-like body. It is shown in FIG. 1 in a relatively collapsed condition, but it is capable of extending from that tail end 22 of the lure body 14 to a relatively extended condition (FIG. 2) in which the color body 24 extends toward the head end 20 of the lure body 14.

The schematic showing as made in the drawings by comparing FIG. 1 and FIG. 2, diagrammatically shows that the coloration-effect sock body 4 and its two conditions as there drawn provide a significant difference in the views, in the appearance of the lure 10 and its body 14. That is, they show difference in appearance between the relatively collapsed (FIG. 1) condition of the coloration-effect body 24, in which it is seen that the general appearance of the lure body 14 is substantially that of the exterior of the lure's wall means 16 (whether the wall means 16 is transparent or translucent, or either of those, and whether also with some coloration or pattern 26) and the relatively extended position (FIG. 2) of the coloration-effect body 24, in which extended condition of sock body 24 the general appearance of the overall lure 10 and its body 14 is substantially that of the coloration-effect sock body 24 as showing through or behind whatever is the exterior-viewed appearance of the lure's exterior wall 16.

Co-operating with the coloration sock body 24 there is also shown as provided condition-change means which provide for achievement of the movement of the coloration-effect body means 24 between and into its conditions of being relatively collapsed and relatively extended; and the condition-change feature is shown differently in the different embodiments, as described herein after now describing a piston feature shown desirably provided in both embodiments.

As shown in the embodiment of FIG. 1, there is shown as provided a piston means 28 connected to the extendible end portion of the coloration-effect body means 24; and, although the piston means 28 is not necessarily tightly fitting against the lure walls 16, the piston means 28 cooperates with the wall 16 to achieve some pumping effect. Further, as to this feature, the lure's exterior wall 16 is shown as provided with an opening means 30; and the movement of the coloration-effect body 24 causes the piston means 28 to correspondingly move and cause some pumping effect which includes some flow of water through the lure wall 16's opening means 30, having some water-agitating and thus more fish-attention-creating effect.

Also, if the user has put some scent material, as is known in the prior art to be attractive to fish, into the lure interior 18, the water emerging out the outlet 30 will contain bits or otherwise have scent nature, hopefully adding to the attraction of the lure 10 to the fish being sought.

Desirably, as shown, the opening means 30 are on both sides of the lure body 14, substantially spaced from the end of the lure body 14 in which the coloration-effect body means 24 is in its relatively collapsed condition; and more particularly in the embodiment of FIG. 1, with the collapsed sock-body 24 adjacent the lure's tail end 22, the opening 30 is adjacent the lure's head end 20 and more particularly in the position of a baitfish's gills.

In the embodiment of FIG. 1, the head end of the lure body wall means 16 is shown as provided with another opening 32; and through this opening 32 there extends an actuator member 34 shown in the form of a wire or rod, the rear end 36 of which is shown connected to the coloration-effect body sock 24; and the wire or rod 34 provides an actuator of the condition-change means of this embodiment.

Also, the member 34 extending as it does through the head 20's end opening 32, the head or front portion 38 of the actuator member 34 which extends outwardly of the lure body head end 20 provides means for connection of the actuator 34 to the associated fishing line 12, for the user's control of the movement and thus the condition of the condition-change body 24.

Tension means 40 are operatively connected (FIGS. 5-7) to the coloration-effect body means 24 and to the tail end 22 of the lure body 14, the tail end 22 being the lure end in FIG. 1 in which the coloration-effect body 24 is while in its relatively collapsed condition, the tension means 40 being operative to pull or bias the coloration-effect body means 24 to its relatively collapsed condition, opposing the extension-movement-inducing effect of the user pulling (through fish line 12) on the actuator wire 34. Desirably such tension means 40 comprises a length of rubber in the interior 18 of the lure body 14, such as a rubber band.

Thus, depending on the stiffness or flexibility of the tension body 40, and the type of pull exerted on the fishing line 12 and actuator member 34, and also to an extent as to the tightness or looseness of fit of the piston means 28 in the wall 16 and the size of the opening 30, the user's pull on the fishing line 12 will cause either a forward movement of the entire lure 10 and an extension of the coloration-effect body 24, or both; and the extension of the coloration body 24 will cause piston means 28 also to pump some water out the gill-opening 30.

The optional effects obtained will give an extra element of challenge to the user, as the user tries to use line-pull maneuvers to produce the type of lure-bait attractiveness which will induce the fish to strike or take the bait lure.

Alternatively to the tension band or body 40, compression means 44 are shown in FIG. 1,2, as disposed between the coloration-effect body means 24 and the head end 20 of the lure body 10, biasing or pushing the coloration-effect body means 24 to its relatively collapsed condition; and as shown the compression means 44 desirably comprises an open-coil compression spring, it being disposed in the interior 18 of the lure body 14, inwardly of the lure walls 16. The spring 44 has the effect of the extension band or body 40 already described.

Further hopeful fish-attracting intrigue or interest is shown as provided by providing a stream-directing baffle means 46 for the gill-location opening means 30 in the lure's side wall means 16, of a slanted orientation such as to cause any water emerging from openings 30 to be directed in the direction of the tail end 22 of the lure body 10; and this provides that as water emerges through side-openings 30 from the interior 18 of the lure body 10, the rearward direction of the movement of such emerging water will give some forward propulsion effect to the lure body. This can help give a sort of jiggling or pulsating effect to the lure body 10, as the user gives a sort of pulsating type of pull on the line 12.

Further option of coloration-change effect is shown (FIGS. 5-7) by the provision of a coloration-effect body means 24 to be provided for each end 20,22 of the lure body 10, one of the coloration-effect bodies 24 being in relatively collapsed condition adjacent the lure's tail end 22 and one of the color bodies 24 being in relatively collapsed condition adjacent the lure's head end 20, each being extendible toward the respective other end of the lure body 10, as by the actuator member 34 or other condition-change means such as disclosed herein.

Another feature which may be desired, depending on what seem to be the feeding habits of the type of fish being sought, is the provision for the lure body to have a hollow chamber 48 provided to be in watertight separation from the interior 18 of the lure body 10, as provided by a wall means 50, providing the hollow chamber 48 to be along the upper portion of the lure body 10 for providing a floatation effect to the lure; and this is shown in FIGS. 7,8.

Figure 9:
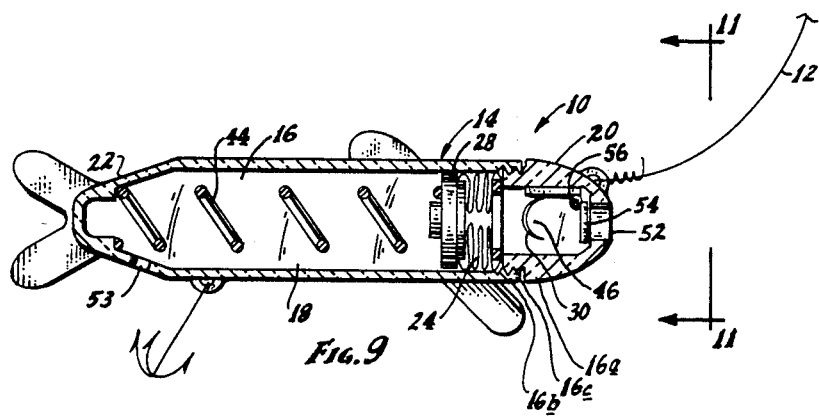
Figure 10:
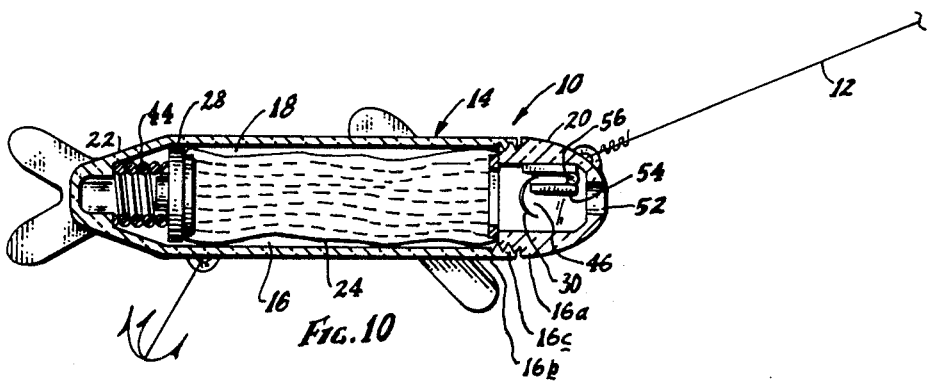

FIGS. 9-12 illustrate a further variation, by an embodiment in which no actuator member 34 need be provided. Therein, there is provided an opening means 52 in the head end 20 of the lure body 10, and the coloration-effect body means 24 is shown provided to include a piston means 28 and be adjacent the head end 20 of the lure body 14 when the coloration-effect body means 24 is in its relatively collapsed condition; and this embodiment thus provides that as the lure body 10 is pulled forwardly in water, the water itself will have an effect of extending the color body 24; i.e., the head end opening means 52 will encounter and receive successive portions of water which will have the accumulative effect of pushing against the piston means 28 and thereby cause the coloration-effect body means 24 to extend to its generally extended condition. Water vents out rear hole 53.

In this embodiment, there are provided means for oppositely urging the coloration-effect body means 24, i.e., toward its relatively collapsed condition. Such urging means can be either a tension means or a compression means such as shown above by components 40 or 44, respectively; and the overall effect of the water coming in through head-hole 52 and the extension-opposing means of 40 or 44, as just mentioned, thus provide condition-change means which can be of pulsating nature if the lure body 10 is pulled in a pulsating motion, which gives an effect of a pulsating extension and collapse of the coloration-effect body means 24.

A further and desired feature of this embodiment, having head-hole 52 for receiving water which relatively pushes the coloration body 24 and its piston means 28 rearwardly, is shown by the provision of a check valve means 54 for the head 20's end opening means 52, the check valve means 54 being operative to resist outward movement of water but permitting inward movement of water through the head-hole 52. Valve 54 is free to move, by hinge 56.

Further, in this embodiment, there is provided an opening means such as the gill-type opening 30 already mentioned, in the wall means 16 at a location rearwardly of the head end opening means 52 but forwardly of the piston means 28 when the piston means 28 is in its forward position, i.e., its position when the coloration-effect body means 24 is in its relatively collapsed condition of this embodiment, thus providing that movement of the piston means 28 forwardly will force water outwardly of the gill-located opening means 30, as the piston means 28 is caused to move forwardly by whichever of the types 40 or 44 provide the means urging the color body 24 and piston 28 forwardly during intervals when the lure body 10 is not being pulled forwardly to cause water coming in the head-hole 52 to push them rearwardly.

In this embodiment as in others having a gill-located opening 30 in the lure's side walls 16, there is also desirably provided a stream-directing baffle means 46 as mentioned above, causing any water emerging therefrom to be directed in the direction of the tail end 22 of the lure body, providing a forward propulsion effect to the lure body 14.

Still further coloration-change is shown in the embodiment of FIG. 13, in which the lure body 14 is provided interiorly of the lure body walls 16 with a different type of coloration-effect means; and in this embodiment the coloration-change effects are provided by a rotatable means 60 with support means 62 supporting the rotatable means 60 for rotational movement with respect to the body member's exterior walls 16, together with the provision of openings 64 and 66 in the lure's exterior walls 16. The openings 64 and 66 as shown are on opposite sides of the rotatable means 60, i.e., the opening 64 being on the side of the rotatable means 60 adjacent the body member's head end 20, and the other opening 66 is located on the side of the rotatable means 60 adjacent the body member's tail end 22.

In this embodiment, the arrangement provides that as the lure body member 14 is pulled forwardly in water the forward opening 64 adjacent the head end 20 will admit water, causing the rotatable means 60 to rotate, as the lure 14 and its forward opening 64 encounter and receive successive portions of water. As the water travels relatively rearwardly of the lure body member 14 toward and thereafter out of the opening 66 adjacent the tail end 22, the water will in effect push against the rotatable means 60, causing the rotatable means 60 to rotate. This causes a change of coloration effect inwardly of the lure body member's exterior wall 16; and, even though inwardly, is visible through the lure walls 16.

More particularly as shown, the rotatable means 60 of this embodiment is of the nature of fan blades or propeller blades 70 carried on a shaft 72; and the support means 62 which supports the shaft 72 supports it in a generally fore-and-aft direction. Motion is provided by one of sets of rotatable means 60 and shaft 72, and the shaft 72 and the shaft support means 62, being relatively rotatable, here the rotatability being that of the blades 70 and shaft 72 being rotatably supported by the bearings which comprise the support means 62, those bearings shown as on legs 74 supported by the lure's walls 16. Different colors on blades 70 add to the color-change effect.

Desirably, all embodiments are provided to have their walls 16 of their body member 14 to be provided to have at least two portions 16a and 16b with releasable means 16c interconnecting them but providing for convenient access to the interior 18 of the lure, such as for the user to service the coloration-effect body means 24 and whatever is the condition-change means of the particular embodiment.

Figure 16:
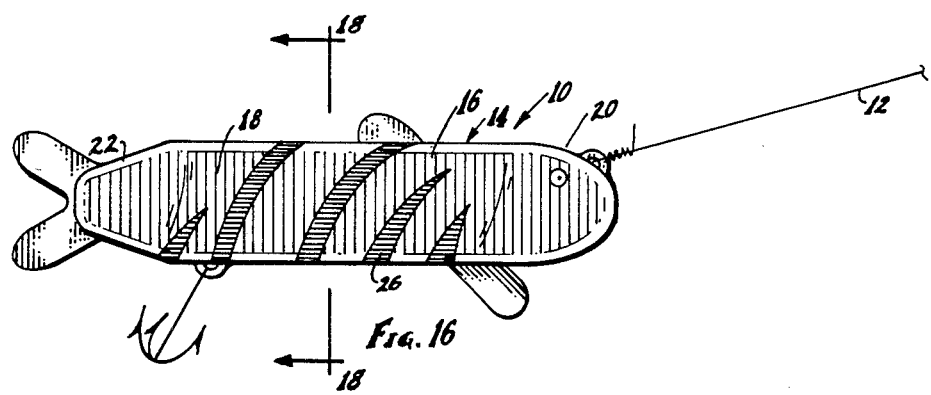
FIG. 16 is a longitudinal view of still another embodiment, this lure being provided inwardly with a coloration-change effect by a liquid having a property of color-change upon change of temperature and/or pressure.
Figure 17:
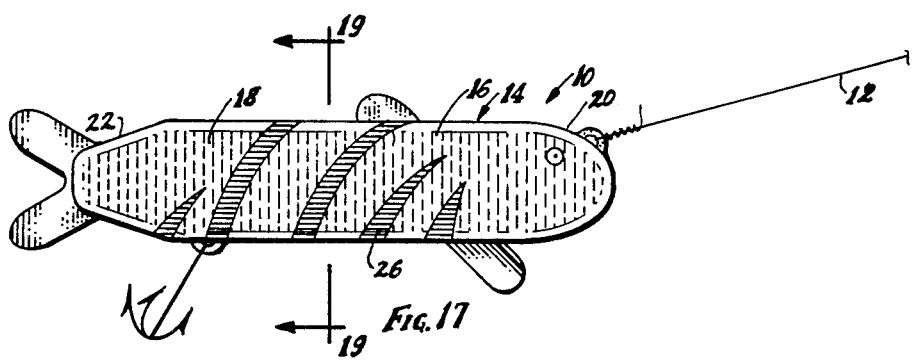
FIG. 17 is a longitudinal view of a lure similar to that of FIG. 16, but having the provision of a gas interiorly of the lure, the gas having a property of color-change upon change of temperature and/or pressure.

Further color-change effect is optionally provided, which may be used in conjunction with or without any of the above-described embodiments which provide changeable color effects, and particularly in fishing in a body of water having significant depth in which water temperature and/or water pressure significantly varies as considered at various depths of the water body. This is the provision of the interior 18 of the lure's body member 14 with fluid which changes coloration upon change of temperature and/or pressure, as is known for fluids, either gas or liquid or both, of the prior art; and these alternative embodiments are schematically shown in FIGS. 16 and 18, and 17 and 19, respectively.

SUMMARIZATION

It is thus seen that this novel fish lure according to the inventive concepts of these embodiments, provides a desired and advantageous lure, yielding the advantages of changeable effects of coloration or appearance by novel means hopefully attractive to fish, and achieving in each embodiment a novel combination having features and advantages not otherwise achieved even though lures of the prior art may have had certain of the concepts individually although not in the novel combinations here achieved for each embodiment.

Accordingly, it will thus be seen from the foregoing description of the invention according to these illustrative embodiments, considered with the accompanying drawings, that the present invention provides new and useful concepts in combination, which provide and achieve a novel and advantageous fish lure, providing characteristics of changeability and other fish-attracting features, automaticness of color change, challenge to the user as to how he applies force to the fishing line, etc., thus yielding desired advantages and characteristics for this type device, and accomplishing the intended objects, including those hereinbefore pointed out and others which are inherent in the invention.

Modifications and variations may be effected without departing from the scope of the novel concepts of the invention; accordingly, the invention is not limited to the specific embodiments or form or arrangement of parts herein described or shown.

Thus, e.g., the phrase "coloration-effect" is used to avoid repetitive uses of terms within that meaning, such as would be indicative of appearance factors of color, pattern, or other features of appearance. "Tubular" as being the lure shape is in the sense of a general resemblance to a bait-fish, in contrast to a geometric specificity. The phrase "sock-like-body" does not preclude a single wall strip, although desirably it would show a coloration effect toward both sides of the lure. "Collapsed" is used in the sense of retracted in contrast to extended, rather than indicating on absolute lack of any strength at all. The location of the collapsed condition of the coloration body is not necessarily at the extreme end (head or tail) of the lure body, and the extention of that coloration body is not necessarily fully to the opposite extreme end; although for more fullness of coloration-change effect the locations are such as to maximize the coloration-difference. The phrase "fan blade" or "propeller blade" is used in the general sense of a body having a surface area which is positioned, with respect to an axis of revolution, such that force parallel to that axis will have a component acting to apply rotational torque with respect to the axis of revolution.

Such choice of terminology is believed to avoid redundancy of expression or repetitive use of alternate expressions, and are believed to operatively set forth the scope of the concepts.

We claim:

1. A fishing lure providing changeable effects, comprising, in combination:
   a body member providing a generally tubularly shaped lure body having an exterior wall means and a generally hollow interior;
   the body member exterior wall means being generally at least translucent;
   and the body member having a head end and tail end, the head end and the tail end being substantially spaced along the lure body;
   at least one of the head end and tail end of the lure body being provided interiorly of the lure body wall means with a coloration-effect body means having a relatively collapsed condition but being capable of extending from that end of the lure body to a relatively extended condition extending toward the other end of the lure body;
   the coloration-effect body means and its said conditions providing a significant difference in the appearance of the lure, between the relatively collapsed condition of the coloration-effect body means, in which condition the general appearance of the lure body is substantially that of the exterior of the lure's wall means, and the relatively extended position of the coloration-effect body means, in which condition the general appearance of the lure body is substantially that of the coloration-effect body means and whatever is the appearance of the exterior of the lure's wall means;
   there being condition-change means providing for achieving movement of the coloration-effect body means between and into its said relatively collapsed condition and its relatively extended condition as aforesaid.

2. The invention as set forth in claim 1, in a combination in which the coloration-effect body means includes a piston means;
   and the lure's exterior wall means is provided with an opening means;
   thus providing that movement of the coloration-effect body means causes the piston means to move and cause flow of water through the lure wall means' opening means.

3. The invention as set forth in claim 2, in a combination in which the said opening means are substantially spaced from the end of the lure body in which the coloration-effect body means is in its said relatively collapsed condition.

4. The invention as set forth in claim 1, in a combination in which the coloration-effect body means in its relatively collapsed condition is adjacent the tail end of the lure body;
   the head end of the lure body wall means being provided with an opening;
   there being an actuator member operatively connected to the coloration-effect body means, providing an actuator of the said condition-change means, and extending through the said head end opening, the portion of the actuator member extending outwardly of the lure body head end providing means for connection thereto of the associated fishing line for the user's control of the movement and condition of the condition-change body means.

5. The invention as set forth in claim 4, in a combination in which tension means are operatively connected to the coloration-effect body means and the tail end of the lure body in which the coloration-effect body means is while in its relatively collapsed condition, the tension means biasing the coloration-effect body means to said relatively collapsed condition.

6. The invention as set forth in claim 5, in a combination in which the tension means comprises a length of rubber in the interior of the lure body.

7. The invention as set forth in claim 4, in a combination in which compression means are disposed between the coloration-effect body means and the head end of the lure body, biasing the coloration-effect body means to said relatively collapsed condition.

8. The invention as set forth in claim 7, in a combination in which the compression means comprises an open-coil spring disposed in the interior of the lure body.

9. The invention as set forth in claim 2, in a combination in which there is provided a stream-directing baffle means for the opening means of the wall means, causing any water emerging therefrom to be directed in the direction of the tail end of the lure body, thus providing that as water emerges from the interior of the lure body, through the opening means of the wall means, the rearward direction of the movement of such emerging water will give a forward propulsion effect to the lure body.

10. The invention as set forth in claim 2, in a combination in which the coloration-effect body means in its relatively collapsed condition is adjacent the tail end of the lure body;

the head end of the lure body wall means being provided with an opening;

there being an actuator member operatively connected to the coloration-effect body means, providing an actuator of the said condition-change means, and extending through the said head end opening, the portion of the actuator member extending outwardly of the lure body head end providing means for connection thereto of the associated fishing line for the user's control of the movement and condition of the condition-change body means.

11. The invention as set forth in claim 1, in a combination in which there is a coloration-effect body means provided for each end of the lure body, one thereof being in relatively collapsed condition adjacent the lure's tail end, and one thereof being in relatively collapsed condition adjacent the lure's head end, but each extendible toward the respective other end.

12. The invention as set forth in claim 1, in a combination in which the lure body is provided to have a hollow chamber provided to be in watertight separation from the interior of the lure body, the hollow chamber being along the upper portion of the lure body for providing a floatation effect to the lure.

13. The invention as set forth in claim 1, in a combination in which there is provided an opening means in the head end of the lure body, and the coloration-effect body means is provided to include a piston means and be adjacent the head end of the lure body when the coloration-effect body means is in its said relatively collapsed condition, the arrangement providing that as the lure body is pulled forwardly in water the said head end opening means will encounter and receive successive portions of water which will in effect push against the piston means and thereby cause the coloration-effect body means to extend to its generally extended condition, and there being means provided for urging the coloration-effect body means toward its said relatively collapsed condition, thus providing the condition change means to be pulsating if the lure body is pulled in a pulsating motion, by the pulsating extension and collapse of the coloration-effect body means.

14. The invention as set forth in claim 13, in a combination in which there is provided a check valve means for the said head end opening means resisting outward movement of water but permitting inward movement of water therethrough, and there is provided an opening means in the wall means rearwardly of the said head end opening means but forwardly of the piston means when the piston means is in its position when the coloration-effect body means is in its said relatively collapsed condition, thus providing that movement of the piston means forwardly will force water outwardly of the opening means in the wall means rearwardly of the said head end opening means, as the piston means is caused to move forwardly by the said urging means during intervals when the lure body is not being pulled forwardly.

15. The invention as set forth in claim 14, in a combination in which there is provided a stream-directing baffle means for the opening means of the wall means, causing any water emerging therefrom to be directed in the direction of the tail end of the lure body, thus providing that as water emerges from the interior of the lure body, through the opening means of the wall means, the rearward direction of the movement of such emerging water will give a forward propulsion effect to the lure body.

16. The invention as set forth in claim 1, in a combination in which the body member is provided to be of at least two portions, with releasable interconnecting means for interconnecting them but providing for convenient access to service the coloration-effect body means and the condition-change means.

* * * * *